United States Patent
Li et al.

(10) Patent No.: US 10,698,973 B2
(45) Date of Patent: Jun. 30, 2020

(54) METHOD AND APPARATUS FOR CONCURRENT READING AND CALCULATION OF MIXED RADIX DFT/IDFT

(71) Applicant: Institute of Automation, Chinese Academy of Sciences, Beijing (CN)

(72) Inventors: Huan Li, Beijing (CN); Xiaoqin Wang, Beijing (CN); Chen Guo, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 2 days.

(21) Appl. No.: 16/068,914

(22) PCT Filed: Jul. 26, 2016

(86) PCT No.: PCT/CN2016/091707
§ 371 (c)(1),
(2) Date: Jul. 10, 2018

(87) PCT Pub. No.: WO2018/018412
PCT Pub. Date: Feb. 1, 2018

(65) Prior Publication Data
US 2019/0042537 A1 Feb. 7, 2019

(51) Int. Cl.
*G06F 17/14* (2006.01)
*G06F 7/48* (2006.01)

(52) U.S. Cl.
CPC .......... *G06F 17/142* (2013.01); *G06F 7/4812* (2013.01)

(58) Field of Classification Search
CPC ...................... G06F 17/14–145; G06F 9/3867
(Continued)

(56) References Cited

U.S. PATENT DOCUMENTS 7,836,116 B1* 11/2010 Goodnight ............ G06F 9/3012
708/404
2010/0070551 A1* 3/2010 Chen ..................... G06F 17/142
708/404
(Continued)

FOREIGN PATENT DOCUMENTS

CN 101763337 A 6/2010
CN 101840393 A 9/2010
(Continued)

OTHER PUBLICATIONS

C.F. Hsiao et al., A Generalized Mixed-Radix Algorithm for Memory-Based FFT Processors, IEEE Transactions on Circuits and Systems—II: Express Briefs, vol. 57 No. 1, 2010 (Year: 2010).*
(Continued)

*Primary Examiner* — Andrew Caldwell
*Assistant Examiner* — Emily E Larocque
(74) *Attorney, Agent, or Firm* — Maier & Maier, PLLC

(57) ABSTRACT

A method for concurrent reading of mixed radix DFT/IDFT data, a method for concurrent calculation of mixed radix DFT/IDFT method, an apparatus for concurrent reading of mixed radix DFT/IDFT data, and an apparatus for concurrent calculation of mixed radix DFT/IDFT. The method for concurrent reading includes: configuring dual circulation parameters according to the number of points corresponding to the number of series to be computed and the number of points corresponding to the number of series accomplished; then, determining the value size between the maximum number of concurrently read data and the product of the number of points corresponding to the number of series accomplished; and based on the result of determination, calculating the dual circulation parameters corresponding thereto according to the result of determination, and con-
(Continued)

currently reading data based on the calculated dual circulation parameters.

1 Claim, 3 Drawing Sheets

(58) Field of Classification Search
USPC .............................. 708/404, 405, 406, 408
See application file for complete search history.

(56) References Cited

U.S. PATENT DOCUMENTS

| | | | |
|---|---|---|---|
| 2010/0174769 A1* | 7/2010 | Modlin | G06F 17/142 |
| | | | 708/404 |
| 2014/0089367 A1* | 3/2014 | Derby | G06F 17/142 |
| | | | 708/404 |
| 2015/0331634 A1* | 11/2015 | Salishchev | G06F 3/0673 |
| | | | 711/149 |

FOREIGN PATENT DOCUMENTS

| | | |
|---|---|---|
| CN | 102023963 A | 4/2011 |
| CN | 103294642 A | 9/2013 |
| CN | 106201999 A | 12/2016 |

OTHER PUBLICATIONS

International Search Report dated May 2, 2017 of corresponding International Application No. PCT/CN2016/091707; 6 pgs.

* cited by examiner

US 10,698,973 B2

METHOD AND APPARATUS FOR CONCURRENT READING AND CALCULATION OF MIXED RADIX DFT/IDFT

FIELD

The embodiments of the present application relate to the technical field of mobile communication, and in particular, to a method for concurrent reading of mixed radix DFT/IDFT data, a method for concurrent calculation of mixed radix DFT/IDFT, an apparatus for concurrent reading of mixed radix DFT/IDFT data, an apparatus for concurrent calculation of mixed radix DFT/IDFT, but not limit hereto.

BACKGROUND

In a digital processing system, especially for a sequence with finite length, a DFT (Discrete Fourier Transform) is a vitally essential mathematic transform. In nature, it is a discrete sampling of finite points of the Fourier transform of a sequence with finite length. It enables the digital signal processing to be accomplished by employing a digital computation method in the frequency domain, enhancing the flexibility of digital signal processing. The DFT has been broadly applied in the field of digital communication, image processing, power spectrum estimation, etc. Wherein, a computation of DFT with a point number of powers of 2 may be accomplished by employing an algorithm of radix 2 FFT. In the case of other point numbers, namely, the computation could not be accomplished by employing a FFT algorithm, it is referred to as a general number DFT.

Presently, a general number DFT generally employs a mixed radix algorithm on the theoretical basis of Cooley-Tukey algorithm. A radix 2 FFT algorithm is derived by modifying on this basis. Its basic idea is: converting a DFT of larger point number to a plurality of DFTs of smaller point number, wherein each round of computation is referred to as one level, each level of computation is executed sequentially to accomplish the entire process of DFT. Typically, the smaller point number is set to a prime number, i.e. 3, 5, . . . , while in computation, it is proceeded in a nested way sequentially in accordance with radix 3, radix 5, . . . . The radix N operation of each level is executed a number of times, but the data which is specific to varies.

$$X(k)=A+W_{N/3}^{k} \times B+W_{N/3}^{2k} \times B+W_{N/3}^{2k} \times C$$

$$X(k+3/N)=A+W_N^{N/3} \times W_{N/3}^{k} \times B+W_N^{2N/3} \times W_{N/3}^{2k} \times C$$

$$X(k+2N/3)=A+W_N^{2N/3} \times W_{N/3}^{k} \times B+W_N^{4N/3} \times W_{N/3}^{2k} \times C \quad (1)$$

Eq (1) is an expression of a radix 3 algorithm, wherein $W_{N/3}^{k}$, $W_{N/3}^{2k}$ are input twiddle factors, which are relevant to k; and $W_N^{N/3}$, $W_N^{2N/3}$, $W_N^{4N/3}$ are output twiddle factors, which are irrelevant to k;

Since the process of a general number DFT is not an integer multiple of 2, when it is processed by a general processor, the data of an integer group may not be read in or wrote out at once, so that the degree of concurrency is reduced. Moreover, the process of a general DFT processing is first proceeded with a multiplication and an addition computation between the data and the input twiddle factors, and then is proceeded with a multiplication and an addition computation between the data and the output twiddle factors, resulting in a comparably larger relevance between data. Moreover, the process of a general number DFT performs the multiplication computation and the addition computation alternatively, which brings in the relevance of calculation again. This leads to a longer waiting cycle of the arithmetic unit caused by the relevance among data, a lower pipeline usage, and so that the processing speed of the entire computation of DFT is reduced.

To this end, the present application is presented hereby.

SUMMARY

The main object of the embodiments of the application is to provide a method for concurrent reading of mixed radix DFT/IDFT data, which at least partially solves the technical problem of how to improve the efficiency of computation. Furthermore, a method for concurrent calculation of mixed radix DFT/IDFT, an apparatus for concurrent reading of mixed radix DFT/IDFT data, and an apparatus for concurrent calculation of mixed radix DFT/IDFT are further provided.

In order to achieve the objects above, according to one aspect of the application, the following technical solutions are provided:

A method for concurrent reading of mixed radix DFT/IDFT data. Said method may comprise:

Configuring dual circulation parameters according to the number of points corresponding to the number of series to be computed and a product of the number of points corresponding to the number of series accomplished;

Determining the value size between a maximum number of concurrently read data and said product of the number of points corresponding to the number of series accomplished;

Calculating the dual circulation parameters corresponding thereto according to the result of determination, and concurrently reading data based on the calculated dual circulation parameters.

Further, said configuring dual circulation parameters according to the number of points corresponding to the number of series to be computed and a product of the number of points corresponding to the number of series accomplished, may particularly comprise:

Configuring the following dual circulation parameters according to the number of points corresponding to the number of series to be computed and the product of the number of points corresponding to the number of series accomplished: $N_1$ is a step size of a first circulation, $N_0$ is a cycle times of the first circulation, $N_2$ is a step size of a second circulation, $$\frac{N}{N_2}$$

is a cycle times of the second circulation, wherein said $N_0$ represents the number of points corresponding to the number of series to be computed, said $N_1$ represents the product of the number of points corresponding to the number of series accomplished, said $N_2$ is the product of said $N_1$ and said $N_0$.

Further, said calculating the dual circulation parameters corresponding thereto according to the result of determination, and concurrently reading data based on the calculated dual circulation parameters, may particularly comprise:

In the case of M being smaller than or equal to $N_1$, calculating the following dual circulation parameters without processing the read twiddle factors:

M is the step size of said first circulation, $[N_1/M] \times N_0$ is the cycle times of said first circulation, $N_2$ is the step size of said second circulation, $$\frac{N}{N_2}$$

is the cycle times of said second circulation, wherein said M represents the maximum number of concurrently read data supported by the processor, said $N_0$ represents the number of points corresponding to the number of series to be computed, said $N_1$ represents the product of the number of points corresponding to the number of series accomplished, and said $N_2$ is the product of said $N_1$ and said $N_0$;

Concurrently reading said data according to the dual circulation parameters above, and reading said M data each time, until all of said $N_1$ data are read.

Further, calculating the dual circulation parameters corresponding thereto according to the result of determination, and concurrently reading data based on the calculated dual circulation parameters, may particularly comprise:

In the case of M being larger than $N_1$, calculating the value of $[M/N_1]$;

Making $[M/N_1]$ copies of the read twiddle factors;

Concurrently reading the preceding $[M/N_1]$ groups of data by the step size of $N_2$ according to the following circulation parameters: $[M/N_1]$ is the step size of said first circulation, $N_0$ is the cycle times of said first circulation, $[M/N_1] \times N_2$ is the step size of said second circulation, $$\frac{N}{N_2[M/N_1]}$$

is the cycle times of said second circulation; wherein said M represents the maximum number of concurrently read data supported by the processor, said $N_0$ represents the number of points corresponding to the number of series to be computed, said $N_1$ represents the product of the number of points corresponding to the number of series accomplished, $N_2$ is the product of said $N_1$ and said $N_0$.

To achieve the object above, a method for concurrent calculation of mixed radix DFT/IDFT based on the method above is further provided, according to another aspect of the application. Said method for concurrent calculation may comprise:

Step 1: Concurrently reading input twiddle factors and output twiddle factors, multiplying the corresponding items thereof, and using the result of multiplication along with said input twiddle factors as equivalent twiddle factors;

Step 2: Multiplying said equivalent twiddle factors and the input data, and caching the result of multiplication.

Step 3: In the second circulation, when executing the multiplication computation in said step 2, reading the result cached in said step 2, and executing corresponding addition or subtraction operation.

Further, said multiplying said equivalent twiddle factors and the input data, and caching the result of multiplication, may particularly comprise:

In the case of no complex number computation unit being disposed in the processor, caching the result of cross multiplication of said equivalent twiddle factors with the real part and the imaginary part of the input data.

Further, said step 3 may particularly comprise:

In the case of a complex number computation unit being disposed in the processor, when executing the multiplication computation in said step 2, reading the result cached in said step 2, and proceeding corresponding addition operation.

Further, said step 3 may further particularly comprise:

In the case of no complex number computation unit being disposed in the processor, when executing the multiplication computation in said step 2, reading the result cached in said step 2, and proceeding the following subtraction operation:

Subtracting the product of said equivalent twiddle factors and said real part of input data with the product of said equivalent twiddle factors and said imaginary part of the input data.

To achieve the objects above, an apparatus for concurrent reading of mixed radix DFT/IDFT data is further provided, according to yet another aspect of the application. Said apparatus for concurrent reading may comprise:

A point number calculating unit, for configuring dual circulation parameters, according to the number of points corresponding to the number of series to be computed and the product of the number of points corresponding to the number of series accomplished;

A group number determining unit, for determining the value size between the maximum number of concurrently read data and said product of the number of points corresponding to the number of series accomplished;

A reading unit, for calculating the dual circulation parameters corresponding thereto according to the result of determination obtained by said group number determining unit, and concurrently reading data based on the calculated dual circulation parameters.

Further, said point number calculating unit may particularly comprise:

A configuration module, for configuring the following dual circulation parameters according to said number of points corresponding to the number of series to be calculated and said product of number of points corresponding to the number of series accomplished: $N_1$ is a step size of a first circulation, $N_0$ is a cycle times of the first circulation, $N_2$ is a step size of a second circulation, $$\frac{N}{N_2}$$

is a cycle times of the second circulation, wherein said $N_0$ represents the number of points corresponding to the number of series to be computed, said $N_1$ represents the product of the number of points corresponding to the number of series accomplished, said $N_2$ is the product of said $N_1$ and said $N_0$.

Further, said reading unit may particularly comprise:

A first calculating module, for calculating the following dual circulation parameters without processing the read twiddle factors in the case of M being smaller than or equal to $N_1$:

M is the step size of said first circulation, $[N_1/M] \times N_0$ is the cycle times of said first circulation, $N_2$ is the step size of said second circulation, $$\frac{N}{N_2}$$

is the cycle times of said second circulation, wherein said M represents the maximum number of concurrently read data supported by the processor, said $N_0$ represents the number of points corresponding to the number of series to be computed, said $N_1$ represents the product of the number of points corresponding to the number of series accomplished, said $N_2$ is the product of said $N_1$ and said $N_0$;

A first reading module, for concurrently reading said data according to the above dual circulation parameters, and reading said M data each time, until all of said $N_1$ data are read.

Further, said reading unit may particularly further comprise:

A second calculating module, for calculating the value of $[M/N_1]$, in the case of M being lager than $N_1$;

A copying module, for making said $[M/N_1]$ copies of the read twiddle factors;

A second reading module, for concurrently reading the preceding said $[M/N_1]$ groups of data by the step size of $N_2$ according to the following dual circulation parameters: $[M/N_1]$ is the step size of said first circulation, $N_0$ is the cycle times of said first circulation, $[M/N_1] \times N_2$ is the step size of said second circulation, $$\frac{N}{N_2[M/N_1]}$$

is the cycle times of said second circulation; wherein said M represents the maximum number of concurrently read data supported by the processor, said $N_0$ represents the number of points corresponding to the number of series to be computed, said $N_1$ represents the product of the number of points corresponding to the number of series accomplished, $N_2$ is the product of said $N_1$ and said $N_0$.

To achieve the objects above, an apparatus for concurrent calculation of mixed radix DFT/IDFT based on the above apparatus for concurrent reading is further provided, according to yet another aspect of the application. Said apparatus for concurrent calculation may comprise:

An equivalent twiddle factor calculating unit, for concurrently reading input twiddle factors and output twiddle factors, multiplying corresponding items thereof, and using the result of multiplication along with said input twiddle factors as equivalent twiddle factors;

A caching unit, for multiplying said equivalent twiddle factors obtained by said equivalent twiddle factor calculating unit, and caching the result of multiplication;

A data processing unit, for reading the result cached in said caching unit and proceeding corresponding addition or subtraction operation when said caching unit executing a multiplication computation in the second circulation.

Further, said equivalent twiddle factor calculating unit may further comprise:

A concurrent reading module, for concurrently reading said input twiddle factors and said output twiddle factors;

A caching module, for multiplying the corresponding items of said input twiddle factors and said output twiddle factors, deriving a first and a second group of equivalent twiddle factors, and storing said first and said second group of equivalent twiddle factors along with said input twiddle factors which serve as a third group of twiddle factors into the cache.

Further, said data processing unit may further comprise:

A complex number computation module, for reading the result cached in said caching unit, and proceeding the corresponding addition operation.

Comparing to the prior art, the above technical solutions at least have the following beneficial effects:

The embodiments of the application configure dual circulation parameters according to the number of points corresponding to the number of series to be computed and the product of the number of points corresponding to the number of series accomplished; then, determine the value size between the maximum number of concurrently read data and the product of the number of points corresponding to the number of series accomplished; and finally, based on the result of determination, calculate the dual circulation parameters corresponding thereto according to the result of determination, and concurrently reading data based on the calculated dual circulation parameter. Thereby, the dual circulation parameters are configured by calculating the information related to the number of points, and when the bit width of the processor is certain, the data are read with the maximum degree of concurrency according to the number of points and the number of computation series, and there is no relevance among data, no rearrangement is required specifically for data when computed, and no transverse operation is required for process, therefore the concurrency of processing is improved and the computation cycle is reduced.

Certainly, any product implementing the application is not necessarily required for implementing all the advantages described above.

Other features and advantages of the application will be explicated in the following description, and, partially become apparent from the description, or be learnt by implementing the present application. The objects and other advantages of the present application may be achieved and obtained with the method particularly cited in the written description, the claims, and the appendant drawings.

BRIEF DESCRIPTION OF DRAWINGS

The appendant drawings, as part of the present application, are used for providing a further comprehension for the application. The illustrative embodiments of the application and the explanation thereof are used for explicating the present application, but not for constructing an inappropriate limitation to the application. Apparently, the appendant drawings in the description below are merely some of the embodiments, and for one of the ordinary skill in the art, other drawings may be further obtained based on these drawings, without contributing inventive efforts. In the appendant drawings.

The appendant drawings and the text description are not intended to limit the scope of protection of the present application by any means, instead, the conception of the application is explained for those skilled in the art by reference to particular embodiments.

DETAILED DESCRIPTION

The addressed technical problems, the adopted technical solutions and the achieved technical effects by the embodiments of the application are described clearly and completely in conjunction with the appendant drawings and the particular embodiments. Apparently, the embodiments described are merely part of the embodiments of the application, rather than all of the embodiments. All the other equivalent and obviously variant embodiments obtained by one of ordinary skill in the art without making inventive efforts, fall within the scope of protection of the application. The embodiments of the application may be particularized in accordance with a plurality of different ways defined and encompassed in the appendant claims.

It should be noted that, in the description below, a number of particular details are given in order to facilitate understanding. However, apparently, these specific details may not be necessary for the implementation of the application.

It should also be noted that, in the circumstances of no explicit definition or no conflict, various embodiments of the application and the technical features therein may be combined with each other to form a technical solution.

The environment in which the embodiments of the application apply is a LTE system in the field of mobile communication, wherein the transmission precoding module of the uplink sending end is a DFT process, and the corresponding receiving end is an IDFT (Inverse Discrete Fourier Transform) process.

According to different number of resources allocated, the number of points N to execute a DFT/IDFT satisfies the following relationship:

$$N=2^\alpha \times 3^\beta \times 5^\gamma, 12 \leq N \leq 1536, \alpha \geq 2, \beta \geq 1, \gamma \geq 0$$

In a particular implementation, FFT may be employed to accomplish the DFT of $2^\alpha$ points, the rest DFT process of radix 3, radix 5 requires to be accomplished using a mixed radix DFT, wherein the mixed radix DFT is required to execute $\beta$ times of radix 3 computation and $\gamma$ times of radix 5 computation, and in an order of first doing radix 3 then doing radix 5.

Figure 1:
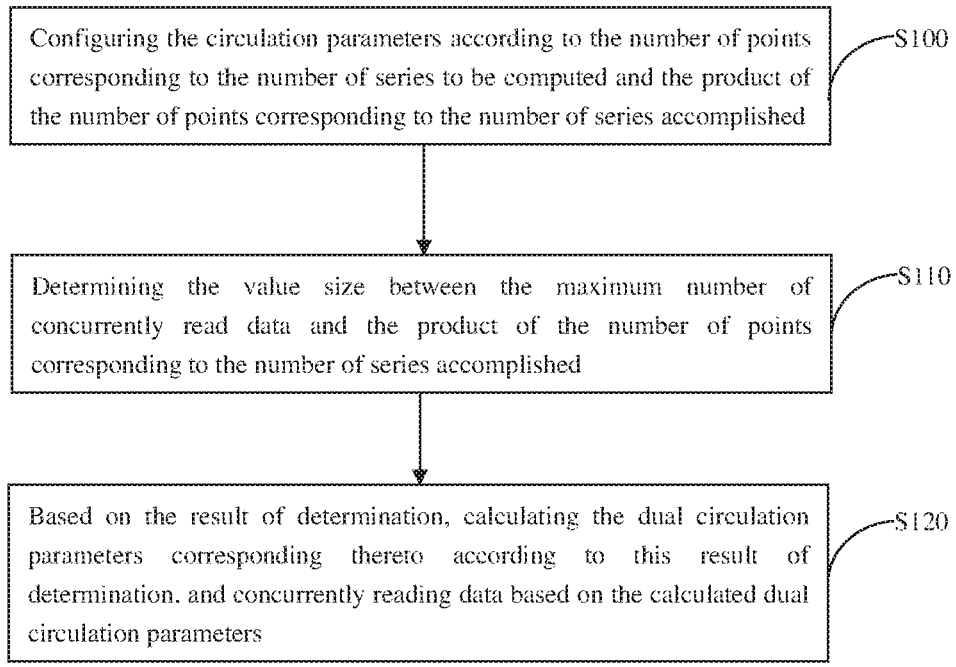
FIG. 1 is a schematic flowchart of the method for concurrent reading of mixed radix DFT and IDFT data, according to one exemplary embodiment.

FIG. 1 exemplarily shows a method for concurrent reading of mixed radix DFT/IDFT data. As shown in FIG. 1, said method may comprise:

S100: Configuring dual circulation parameters according to the number of points corresponding to the number of series to be computed and a product of the number of points corresponding to the number of series accomplished.

S110: Determining the size between a maximum number of concurrently read data and the product of the number of points corresponding to the number of series accomplished.

S120: Calculating the dual circulation parameters corresponding thereto according to the result of determination, and concurrently reading data based on the calculated dual circulation parameters.

The embodiments of the application configure the dual circulation parameters by calculating the information related to the number of points, the data are read with maximum degree of concurrency when the bit width of the processor is certain, and therefore the degree of concurrency is improved.

As an optional implementation of this embodiment, configuring a dual circulation parameters according to the number of points corresponding to the number of series to be computed and the product of a number of points corresponding to the number of series accomplished, may particularly comprise: configuring the following dual circulation parameters according to the number of points corresponding to the number of series to be computed and a product of the number of points corresponding to the number of series accomplished: $N_1$ is a step size of a first circulation, $N_0$ is a cycle times of the first circulation, $N_2$ is a step size of a second circulation, $$\frac{N}{N_2}$$

is a cycle times of the second circulation, wherein $N_0$ represents the number of points corresponding to the number of series to be computed, $N_1$ represents the product of the number of points corresponding to the number of series accomplished, $N_2$ is the product of $N_1$ and $N_0$.

As an optional implementation of this embodiment, based on the result of determination, calculating the dual circulation parameters corresponding thereto according to the result of determination, and concurrently reading data based on the calculated dual circulation parameters, may particularly comprise:

In the case of M being smaller than or equal to $N_1$, the read twiddle factors are not processed, and the following dual circulation parameters are calculated:

M is the step size of said first circulation, $[N_1/M] \times N_0$ is the cycle times of said first circulation, $N_2$ is the step size of said second circulation, $$\frac{N}{N_2}$$

is the cycle times of said second circulation, wherein said M represents the maximum number of concurrently read data supported by a processor, said $N_0$ represents the number of points corresponding to the number of series to be computed, said $N_1$ represents the product of the number of points corresponding to the number of series accomplished, said $N_2$ is the product of $N_1$ and $N_0$;

Said data are concurrently read according to the dual circulation parameters above, and said M data are read each time, until all of said $N_1$ data are read.

The embodiments of the application configure the dual circulation parameters by calculating the information related to the number of points, the data are read with maximum degree of concurrency when the bit width of the processor is certain, and there is no relevance between data, and no process of lateral operation is required, therefore the degree of concurrency of processing is improved.

As an optional implementation of this embodiment, based on the result of determination, calculating the dual circulation parameters corresponding thereto according to the result of determination, and concurrently reading data based on the calculated dual circulation parameters, may particularly further comprise:

In the case of M being larger than $N_1$, calculating the value of $[M/N_1]$, making $[M/N_1]$ copies of the read twiddle factors, and concurrently reading the preceding $[M/N_1]$ groups of data by the step size of $N_2$ according to the following circulation parameters: $[M/N_1]$ is the step size of the first circulation, $N_0$ is the cycle times of the second circulation, $[M/N_1] \times N_2$ is the step size of the second circulation, $$\frac{N}{N_2[M/N_1]}$$

is the cycle times of the second circulation, wherein M represents the maximum number of concurrently reading data supported by the processor, $N_0$ represents the number of points corresponding to the number of series to be computed, $N_1$ represents the product of the number of points corresponding to the number of series accomplished, $N_2$ is the product of $N_1$ and $N_0$.

The embodiment of the application configures the dual circulation parameters by calculating the information related to the number of points, the data are read with maximum degree of concurrency when the bit width of the processor is certain, and there is no relevance between data, and no process of lateral operation is required, therefore the degree of concurrency of processing is improved.

The embodiment of the application may be based on any process of mixed radix, considering that the theory of mixed radix may take any number and is unlikely to be exhaustively illustrated, hence, the present application is elaborated using radix 3 as an example in a preferred way.

Assume that: $N_0$ represents the number of points corresponding to the number of series to be computed; $N_1$ represents the product of the number of points corresponding to the number of series accomplished; M represents the maximum number of concurrently read data supported by the processor (may be valued at 16); N represents the number of points of a DFT (may be valued at 1200 points).

S200: Calculating $N_0$ and $N_1$, $N_0=3$, $N_1=16$, and determining the circulation parameters according to $N_0$ and $N_1$, wherein the circulation parameters comprise a step size and a cycle times of a first circulation, a step size and a cycle times of a second circulation.

In this step, $N_2$ is the product of $N_0$ and $N_1$, $N_1$ is the step size of the first circulation, $N_0$ is the cycle times of the first circulation, $N_2$ is the step size of the second circulation, $$\frac{N}{N_2}$$

is the cycle times of the second circulation, thereby, the following may be derived by calculation: $N_2=48$, the step size of the first circulation is 16, the cycle times of the first circulation is 3; the step size of the second circulation is 48, and the cycle times of the second circulation is 25.

Step one: Determining the relationship of value size between M and $N_1$. If M is smaller than $N_1$, then execute step two; otherwise, execute step three.

Step two: concurrently reading the data according to the following circulation parameters without processing the read twiddle factors, and reading M data each time, until all of the $N_1$ data are read:

M is the step size of the first circulation, $[N_1/M] \times N_0$ is the cycle times of the first circulation, $N_2$ is the step size of the second circulation, $$\frac{N}{N_2}$$

is the cycle times of the second circulation.

At this point, the degree of concurrency is 16, the bandwidth utilization ratio is 1. In this step, the second circulation parameters are constant. In practical applications, the first circulation parameters and the second circulation parameters may be adjusted according to the bit width of the processor.

Step three: Calculating the value of $[M/N_1]$, making $[M/N_1]$ copies of the read twiddle factors, and concurrently reading the preceding $[M/N_1]$ groups of data by the step size of $N_2$ according to the following circulation parameters: $[M/N_1]$ is the step size of the first circulation, $N_0$ is the cycle times of the first circulation, $[M/N_1] \times N_2$ is the step size of the second circulation, $$\frac{N}{N_2[M/N_1]}$$

is the cycle times of the second circulation.

At this point, the degree of concurrency is $[M/N_1]N_1$.

Figure 2:
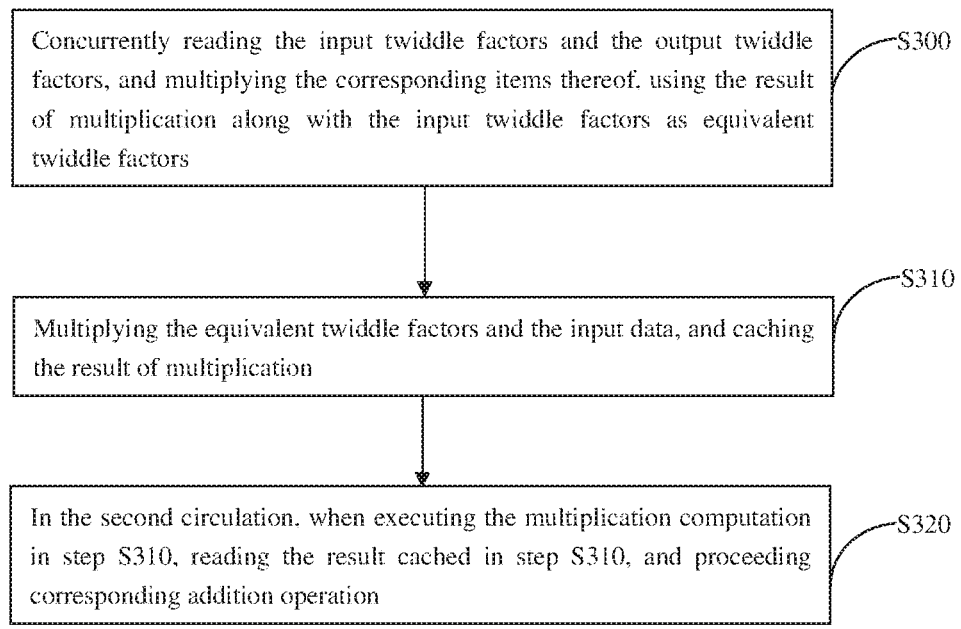
FIG. 2 is a schematic flowchart of the method for concurrent calculation of mixed radix DFT and IDFT, according to another exemplary embodiment.

Based on the above embodiment, an embodiment of the application further provides a method for concurrent calculation of mixed radix DFT/IDFT. As shown in FIG. 2, said method may be implemented through step S300 to step S320.

S300: Concurrently reading the input twiddle factors and the output twiddle factors, multiplying the corresponding items thereof, and using the result of multiplication along with the input twiddle factors as equivalent twiddle factors.

Figure 3:
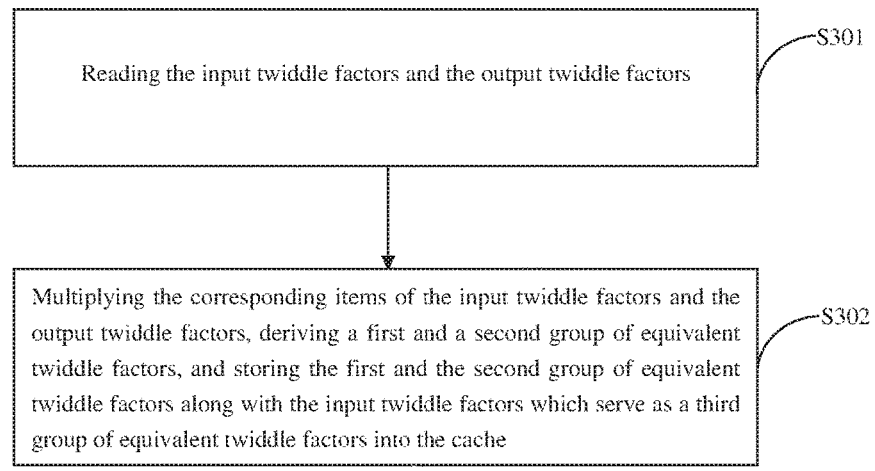
FIG. 3 is a schematic flowchart of concurrently reading input twiddle factors and output twiddle factors, multiplying the corresponding items thereof, and using the result of multiplication along with the input twiddle factors as equivalent twiddle factors, according to one exemplary embodiment.

Particularly, as shown in FIG. 3, this step may comprise: step S301 and step S302.

S301: Concurrently reading the input twiddle factors and the output twiddle factors.

S302: Multiplying the corresponding items of the input twiddle factors and the output twiddle factors, deriving a first and a second group of equivalent twiddle factors, and storing the first and the second group of equivalent twiddle factors along with the input twiddle factors which serve as a third group of equivalent twiddle factors into a cache.

The process of deriving the equivalent twiddle factors are elaborated below using radix 3 as an example in a preferred way.

Step one: Concurrently reading the input twiddle factors ($W_{N/3}^{k}$, $W_{N/3}^{2k}$) and the output twiddle factors ($W_{N}^{N/3}$, $W_{N}^{2N/3}$) and ($W_{N}^{2N/3}$, $W_{N}^{4N/3}$), wherein W is a label of a twiddle factor; and k is the size of data for executing a radix N operation, which is valued at 0,1, ... N−1.

Step two: Multiplying the corresponding items of the input twiddle factors and the output twiddle factors, deriving a first and a second group of equivalent twiddle factors: ($W_{N/3}^{k} \times W_{N}^{N/3}$, $W_{N/3}^{2k} \times W_{N}^{2N/3}$), ($W_{N/3}^{k} \times W_{N}^{N/3}$, $W_{N/3}^{2k} \times W_{N}^{2N/3}$), and storing the first and the second group of equivalent twiddle factors along with the input twiddle factors which serve as a third group of equivalent twiddle factors into a cache.

Wherein, caching may be executed by the following means: the factors of which the input twiddle factors and the output twiddle factors are of a constant value 1. The input twiddle factors are required to store $(N_0-1) \times N_1$ different data according to different data, and the output twiddle factors only have $(N_0-1) \times (N_0-1)$ different data, therefore, the result by multiplying corresponding items thereof has $(N_0-1) \times (N_0-1) - N_1$ different data.

S310: multiplying the equivalent twiddle factors and the input data, and caching the result of multiplication.

Particularly, with radix 3 as an example, this step uses the two groups of equivalent twiddle factors ($W_{N/3}^{k} \times W_{N}^{N/3}$, $W_{N/3}^{2k} \times W_{N}^{2N/3}$) and ($W_{N/3}^{k} \times W_{N}^{2N/3}$, $W_{N/3}^{2k} \times W_{N}^{4N/3}$) obtained from step S302 and the input twiddle factors ($W_{N/3}^{k}$, $W_{N/3}^{2k}$) as three groups of equivalent twiddle factors and multiplies them with the input data.

Wherein, the result of multiplication is $W_{N/3}^k \times B$, $W_{N/3}^{2k} \times C$, $W_N^{N/3} \times W_{N/3}^k \times B$, $W_N^{2N/3} \times W_{N/3}^{2k} \times C$, $W_N^{2N/3} \times W_{N/3}^k \times B$, $W_N^{4N/3} \times \times W_{N/3}^{2k} \times C$, wherein B and C represent the input data.

In an optional embodiment, if there is no complex number computation unit in the processor, then this step caches the result of multiplication of the equivalent twiddle factors, and the real part and imaginary part of the input data.

When this step is being calculated, since the twiddle factors use equivalent twiddle factors in the cache in a computation process for each group, the computation process for each group only comprises a multiplication and an addition computation of the input data and the twiddle factors, there is no prior and posterior relevance of data between the computation process for each group, and this process only needs to be executed once during the 25 computations in the second circulation.

S320: reading the result cached in step S310, and executing corresponding addition or subtraction operation in the second circulation, when the multiplication computation in S310 is executed.

Wherein, as one of the preferred embodiments, using radix 3 as an example, in the case that a complex number computation unit is disposed in the processor, the addition operation may be $A+W_{N/3}^k \times B+W_{N/3}^{2k} \times C$, $A+W_N^{N/3} \times W_{N/3}^k \times B+W_N^{2N/3} \times W_{N/3}^{2k} \times C$, $A+W_N^{2N/3} \times W_{N/3}^k \times B+W_N^{4N/3} \times W_{N/3}^{2k} \times C$, wherein A, B, and C represent input data, respectively.

The embodiments of the application multiply the input and the output twiddle factors, and then separate the multiplication and the addition operation completely by caching the result of multiplication of the calculation process, reducing the relevance in the entire computation process, improving the utilization rate of the streamline, and further increasing the computation speed.

In an optional embodiment, if no complex number computation unit is disposed in the processor, then this step comprises a subtraction operation of the product between the equivalent twiddle factors and the real part of the input data and the product between the equivalent twiddle factors and the imaginary part of the input data.

The embodiment of the application separates the multiplication and the subtraction operation completely, so as to improve the utilization rate of the streamline of each component, and further increase the computation speed.

In conclusion, when the embodiment of the application calculates, a multiplication operation between the equivalent twiddle factors and the input data is first executed during each group of computation process, and then the results of multiplications are stored in the cache. The result data of multiplications in the cache are read to perform an addition operation and a subtraction operation when the multiplication operation for the next group of computation is being executed, so as to avoid the idle slot of the arithmetic unit caused by the relevance among data.

Although the various steps are described in accordance with the above sequential order in the above embodiment, one of ordinary skill in the art may understand, in order to implement the effects of this embodiment, various steps are not required to be executed in accordance with such an order, instead, they may be executed simultaneously (concurrently) or in a converse order, all of these simple variations fall within the scope of protection of the application.

Figure 4:
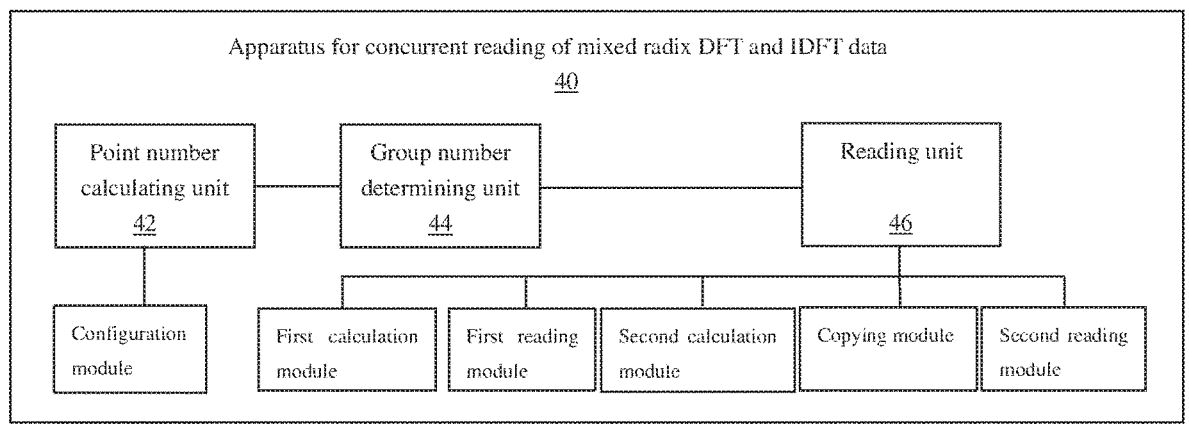
FIG. 4 is a schematic structural diagram of an apparatus for concurrent reading of mixed radix DFT and IDFT data, according to one exemplary embodiment.

Based on the same technical conception as the above embodiment of the method for concurrent reading, the embodiment of the application further provides an apparatus for concurrent reading of mixed radix DFT/IDFT data. As shown in FIG. 4, this apparatus 40 may comprise a point number calculating unit 42, a group number determining unit 44, and a reading unit 46, wherein the point number calculating unit 42 is used for configuring dual circulation parameters according to the number of points corresponding to the number of series to be computed and the product of the number of points corresponding to the number of series accomplished, and concurrently reading the data based on the calculated dual circulation parameters.

This embodiment of the apparatus for concurrent reading of mixed radix DFT/IDFT data configures the dual circulation parameters by calculating the information related to the number of points, when the bit width of the processor is certain, the data are read in a maximum concurrency according to the number of points and the number of computation series, and there is no relevance among data, hence the concurrency of processing is improved and the cycle of computation is reduced.

On the basis of the above embodiment, the point number calculating unit 42 above may further comprise a configuration module. Said configuration module is used for configuring the following dual circulation parameters according to the number of points corresponding to the number of series to be computed and the product of the number of points corresponding to the number of series accomplished: $N_1$ is the step size of the first circulation, $N_0$ is the cycle times of the first circulation, $N_2$ is the step size of the second circulation, $$\frac{N}{N_2}$$

is the cycle times of the second circulation, wherein $N_0$ represents the number of points corresponding to the number of series to be computed, $N_1$ represents the product of the number of points corresponding to the number of series accomplished, and $N_2$ is the product of $N_1$ and $N_0$.

On the basis of the embodiment shown in FIG. 4, the reading unit 46 may further comprise a first calculation module and a first reading module, wherein the first calculation module is used for calculating the following dual circulation parameters without processing the read twiddle factors in the case of M being smaller or equal to $N_1$:

M is the step size of the first circulation, $[N_1/M] \times N_0$ is the cycle times of the first circulation, $N_2$ is the step size of the second circulation, $$\frac{N}{N_2}$$

is the cycle times of the second circulation; wherein M represents the maximum number of concurrently read data supported by the processor, $N_0$ represents the number of points corresponding to the number of series to be computed, $N_1$ represents the product of the number of points corresponding to the number of series accomplished, and $N_2$ is the product of $N_1$ and $N_0$. The first reading module is used for concurrently reading the data according to the dual circulation parameters above, and reading M data each time, until all of $N_1$ data are read.

On the basis of the embodiments shown in FIG. 4, the reading unit 46 may further comprise a second calculation module, a copying module and a second reading module, wherein the second calculation module is used for calculating the value of [M/N$_1$], in the case of M being larger than N$_1$, the copying module is used for making [M/N$_1$] copies of the read twiddle factors, and the second reading module is used for concurrently reading the preceding [M/N$_1$] groups of data with a step size of N$_2$ according to the following dual circulation parameters: ⌊M/N$_1$⌋ is the step size of the first circulation, N$_0$ is the cycle times of the first circulation, [M/N$_1$]×N$_2$ is the step size of the second circulation, and $$\frac{N}{N_2[M/N_1]}$$

is the cycle times of the second circulation, wherein M represents the maximum number of concurrently read data supported by the processor, N$_0$ represents the number of points corresponding to the number of series to be computed, N$_1$ represents the product of the number of points corresponding to the number of series accomplished, and N$_2$ is the product of N$_1$ and N$_0$.

The explanation related to said embodiment of the apparatus for concurrent reading may refer to the explanation of the embodiment of the method for concurrent reading related thereto, and will not be described repeatedly herein.

It should be noted that, the apparatus for concurrent reading of mixed radix DFT/IDFT data provided by the above embodiment, is merely illustrated with the division of various function modules above, and in the practical application, the above functions may be assigned to be accomplished by various function modules as needed, i.e., the internal structure of the apparatus is divided into various function modules to accomplish all or part of the functions described above.

Figure 5:
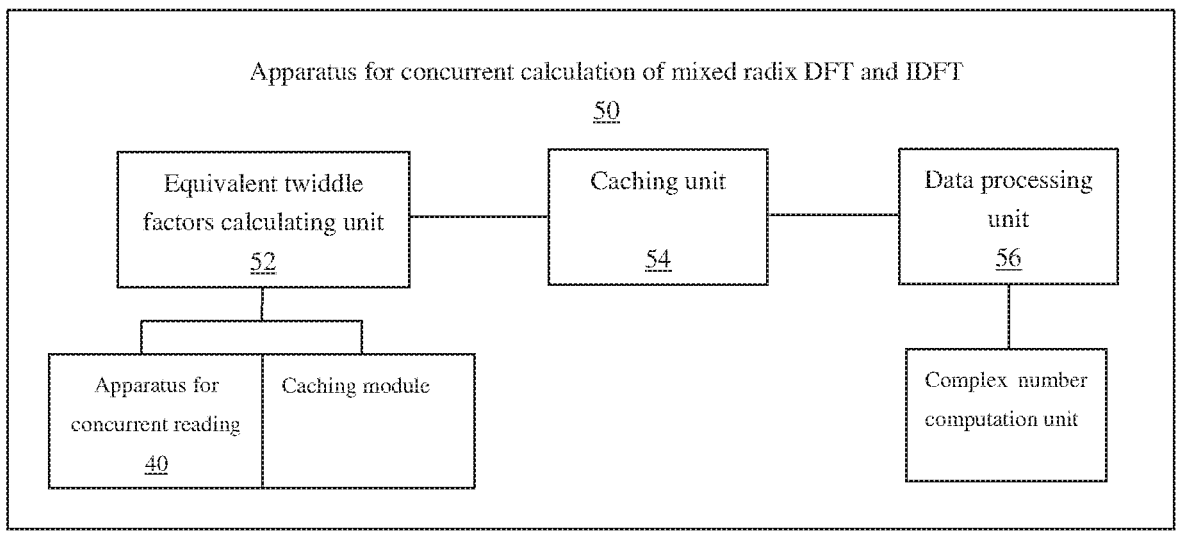
FIG. 5 is a schematic structural diagram of an apparatus for concurrent calculation of mixed radix DFT and IDFT, according to one exemplary embodiment.

Furthermore, the embodiment of the application further provides an apparatus for concurrent calculation of mixed radix DFT/IDFT based on the above embodiment of the apparatus for concurrent reading. As shown in FIG. 5, said apparatus 50 may comprise an equivalent twiddle factors calculating unit 52, a caching unit 54 and a data processing unit 56, wherein the equivalent twiddle factors calculating unit 52 is used for concurrently reading the input twiddle factors and the output twiddle factors, multiplying the corresponding items thereof, and using the result of multiplication along with the input twiddle factors as equivalent twiddle factors; the caching unit 54 is used for multiplying the equivalent twiddle factors obtained from the equivalent twiddle factors calculating unit 52 and the input data, and caching the result of multiplication; and the data processing unit 56 is used for reading the result cached in the caching unit 54 and proceeding corresponding addition and subtraction operation when the caching unit 54 executes a multiplication computation in the second circulation.

When the embodiment of the apparatus for concurrent calculation of mixed radix DFT/IDFT performs the computation, the twiddle factors are processed by preference, and the multiplication computation and the addition/subtraction computation are separated, hence the relevance among data is reduced, so as to reduce the idle slot of the entire computation, improve the utilization rate of the streamline, and effectively increase the computation speed of mixed radix DFT and IDFT.

On the basis of the above embodiment, the above equivalent twiddle factors calculating unit 52 may further comprise a concurrent reading module and a caching module, wherein the concurrent reading module is used for concurrently reading the input twiddle factors and the output twiddle factors, and the caching module is used for multiplying the corresponding items of the input twiddle factors and the output twiddle factors, deriving a first and a second group of equivalent twiddle factors, and storing the first and the second group of equivalent twiddle factors along with the input twiddle factors which serve as a third group of equivalent twiddle factors into the cache.

On the basis of the embodiment shown in FIG. 5, the data processing unit may further comprise a complex number computation unit, wherein the complex number computation unit is used for reading the result cached in the caching unit, and proceeding the corresponding addition operation.

The explanation related to said embodiment of apparatus for concurrent calculation may refer to the explanation related to the embodiment of the method for concurrent calculation related thereto, and will not be described repeatedly herein.

It should be noted that, when the apparatus for concurrent calculation of mixed radix DFT/IDFT provided by the above embodiment executes the concurrent calculation, it is only illustrated with the division of the various function modules above, and in the practical application, the above functions may be assigned to different function modules to be accomplished as needed, i.e., the internal structure of the apparatus is divided into various function modules, to accomplish all or part of the functions described above.

It may be understood by one of ordinary skill in the art, that the above apparatus for concurrent reading of mixed radix DFT/IDFT data and the apparatus for concurrent calculation of mixed radix DFT/IDFT may further comprise some other well-known structures, such as a processors, controllers, memories, etc., wherein the memories include but not limit to random access memories, flashes, read only memories, programmable read only memories, volatile memories, non-volatile memories, serial memories, parallel memories, or registers, etc., the processors include but not limit to CPLDs/FPGAs, DSPs, ARM processors, MIPS processors, etc., where these well-known structures are not shown in FIGS. 4-5, to avoid unnecessarily obscuring the embodiments of the disclosure.

It should be understood that the numbers of each module in FIGS. 4-5 are merely illustrative. Each module may be of any numbers.

The embodiment of the apparatus above may be used for executing the embodiment of the corresponding method above, the technical principle, the addressed technical problems and the generated technical effects thereof are similar, one of ordinary skill in the art may clearly learn that the particular operating process and the related explanation of the apparatus described above may refer to the corresponding process in the preceding embodiments of method, and will not be described repeatedly herein. It should be noted that, the embodiment of the apparatus and the embodiment of the method of the application are described respectively, however, the details described for one embodiment may also be applied to the other embodiment. The name of the modules and steps referred to in the embodiments of the application are merely used for distinguishing various modules or steps, and should not be construed as an inappropriate limitation of the application. It should be understood by those skilled in the art that: the modules or steps in the embodiments of the application may be further divided or combined. For example, the modules of the above embodiment may be combined into one module, and may be further divided into a plurality of sub-modules as well.

The above technical solutions provided by the embodiments of the application are introduced in details. The principle and the embodiments of the application are set forth with particular examples herein, however, the explanation of the embodiments above are merely appropriate for facilitating the understanding of the principle of the embodiments of the application; moreover, for those skilled in the art, changes may be made both within the scope of particular embodiments and applications, in accordance with the embodiments of the application.

It should be noted that, the flowchart or block diagram referred to herein are not only limited to the form shown herein, but may also be divided and/or combined in other ways.

It should also be noted that: the labels and characters in the appendant drawings are merely for explaining the present application more clearly, and should not be construed as an inappropriate limitation of the scope of protection of the application.

It should be yet further noted that, the terms "first", "second", etc. in the description and claims of the application and the appendant drawings described above are used for distinguishing similar objects, rather than for describing or representing a particular order or sequential order. It should understood that the data used this way may be interchanged under suitable circumstances, so that the embodiments of the application described herein may be implemented in an order other than those illustrated or described herein.

The terms "comprise", "include" or any other similar phrases intend to contain all non-exclusive inclusions, so that the processes, methods, articles or devices/apparatuses comprising a series of factors may not only comprise those factors, but also comprise other factors that are not listed explicitly, or also comprise the inherent factors of these processes, methods, articles or devices/apparatuses.

As used herein, the terms "module" and "unit" may refer to the software objects or routines executed on the computing system. Various modules described herein may be implemented as an object or a process executed on the computing system (e.g., as an independent thread). Although the systems and methods described herein are preferably implemented with software, implementing with hardware or a combination of software and hardware may also be possible and may be thought of.

Various steps of the application may be implemented with a general purpose computing apparatus, for example, they may be integrated on a single computing apparatus, such as: a personal computer, a server computer, a handheld device or portable device, a tablet device or multi-processor device, and may also be distributed on a network consisted of a plurality of computing apparatuses, which may execute the shown or described steps in an order other than the order herein, or may be implemented by making them into various integrated circuit modules, or by making a plurality of modules or steps thereof into a single integrated circuit module. Therefore, the present application is not limited to any particular hardware or software of the combination thereof.

The method provided by the application may be implemented using a programmable logic, or may be implemented as a computer program software or program module (which comprises a routine, a program, an object, a component, or a data structure, etc., for executing particular tasks or implementing particular abstract data types), for example, it may be a computer program product according to the embodiments of the application, said computer program product is operated to enable the computer to execute the method for demonstration. Said computer program product comprises a computer readable storage medium, which comprises the logic or code part of the computer program, for implementing said method. Said computer readable storage medium may be an internal medium installed in the computer, or may be a movable medium detachable from the main body of the computer (e.g., a storage device utilizing hot plug). Said internal medium includes but not limit to a rewritable non-volatile memory, such as: a RAM, a ROM, a flash or a hard disk. Said movable media includes but not limit to: an optical storage media (e.g. a CD-ROM and a DVD), a magnetic storage medium (e.g. a magnetic tape or a portable hard drive), a medium with an internal rewritable non-volatile memory (e.g., a memory card), and a medium with an internal ROM (e.g., a ROM case).

The present application are not limited to the above embodiments, any variations, modifications, or alternations that one of ordinary skill in the art may think of will fall within the scope of protection of the application, without departing the substantial content of the application.

What is claimed is:

1. A method for concurrent reading of mixed radix DFT/IDFT data, comprising:
    configuring dual circulation parameters according to a number of points corresponding to a number of series to be computed and a product of the number of points corresponding to the number of series accomplished;
    determining a value size between a maximum number of concurrently read data and said product of the number of points corresponding to the number of series accomplished; and
    calculating the dual circulation parameters corresponding thereto according to the result of determination, and concurrently reading data based on the calculated dual circulation parameters.

* * * * *